US 6,741,461 B1

(12) United States Patent
Owoeye et al.

(10) Patent No.: US 6,741,461 B1
(45) Date of Patent: May 25, 2004

(54) CHILD-FRIENDLY PERSONAL COMPUTER HOUSING AND SYSTEM

(76) Inventors: Bunmi Owoeye, 512 Purce St., Hillside, NJ (US) 07205; Aderemi Owoeye, 512 Purce St., Hillside, NJ (US) 07205

( * ) Notice: Subject to any disclaimer, the term of this patent is extended or adjusted under 35 U.S.C. 154(b) by 0 days.

(21) Appl. No.: 10/335,164

(22) Filed: Dec. 31, 2002

(51) Int. Cl.[7] .................................................. H05K 5/00
(52) U.S. Cl. ..................... 361/683; 312/223.3; 292/148; 446/431
(58) Field of Search ................................. 361/680–687, 361/724–727; 446/297, 357, 431; 463/45; 312/223.1–223.6; 348/551–553; 292/42, 148, 151, 307 R

(56) References Cited

U.S. PATENT DOCUMENTS

| | | | |
|---|---|---|---|
| 6,359,773 B1 * | 3/2002 | Chang et al. | 361/680 |
| 6,522,537 B2 * | 2/2003 | Chen | 361/687 |
| 2002/0077024 A1 * | 6/2002 | Choi | 446/357 |
| 2003/0224694 A1 * | 12/2003 | Hoeting et al. | 446/431 |

* cited by examiner

Primary Examiner—Hung Van Duong

(57) ABSTRACT

A personal computer that looks like a school bus or other toy, which uses characteristic items on the toy for computer control and status functions. A common computer mainframe connects to standard peripheral components in the ordinary way, including a monitor, keyboard, mouse, printer, etc. However, the computer housing has the shape of a school bus or other toy, with various features incorporated into the unit via a combination of molded plastic and printing on the surface and added modeling details, such as headlights, taillights, running lights, tires in wheel wells, grill, bumpers, license plate, etc. Functions like CD/DVD drives and floppy drives emerge from the luggage area on top of the vehicle or extend underneath the grille of the vehicle for easy access. The power supply mounts in the rear of the vehicle with a motherboard running along the bottom portion of the vehicle. Peripheral component connectors are located along the bottom of the bus. All these components would typically be off-the-shelf personal computer components of the more recent smaller size.

20 Claims, 4 Drawing Sheets

CHILD-FRIENDLY PERSONAL COMPUTER HOUSING AND SYSTEM

BACKGROUND OF THE INVENTION

1. Field of the Invention

The present invention relates to external housings for use in connection with personal computers. The personal computer housing has particular utility in connection with providing computers and computer systems for children.

2. Description of the Prior Art

The use of personal computers has become a way of life in many homes. Young children are becoming quite proficient with computers. However, there is the potential to increase children's interest in computers considerably by providing hardware that is more child-friendly. This invention provides computers that have an outward appearance of a toy or other familiar object rather than just a box or tower.

Of course, the use of personal computers is known in the prior art. For example, U.S. Pat. No. 5,748,442 to Toor discloses a personal computer and chassis having interchangeable trim plates for use in configuring the computer as a horizontal or a tower model. However, the Toor '442 patent does not provide a computer that has various toy-shaped outer housings installed over a computer mainframe and has a common interface built into both the mainframe and the housing component.

U.S. Design Pat. No. D445,419 to Lee et al., U.S. Design Pat. No. D441,746 to Doczy et al., and U.S. Design Pat. No. D439,248 to Massaro et al., disclose designs for personal computer vertical towers. However, these patents do not provide a computer that has various toy-shaped outer housings installed over a computer mainframe and has a common interface built into both the mainframe and the housing component.

Lastly, U.S. Design Pat. No. D329,830 to Girardib and U.S. Design Pat. No. D433,467 to Tsai disclose designs for toy buses. However, these are solely toys and do not have any computer related functionality and furthermore, cannot be interfaced with a compute mainframe.

While the above-described devices fulfill their respective, particular objectives and requirements, the aforementioned patents do not describe a personal computer housing that has the appearance of a toy, that is capable of being interfaced with a personal computer, and provides the functionality for controlling a computer.

Therefore, a need exists for a new and improved personal computer housing that can be used to provide more child-friendly computers. In this regard, the present invention substantially fulfills this need. In this respect, the personal computer housing according to the present invention substantially departs from the conventional concepts and designs of the prior art, and in doing so provides an apparatus primarily developed for the purpose of providing child-friendly personal computers.

SUMMARY OF THE INVENTION

In view of the foregoing disadvantages inherent in the known types of personal computers for children now present in the prior art, the present invention provides an improved personal computer housing and system, and overcomes the above-mentioned disadvantages and drawbacks of the prior art. As such, the general purpose of the present invention, which will be described subsequently in greater detail, is to provide a new and improved personal computer housing and system which has all the advantages of the prior art mentioned heretofore and many novel features that result in a personal computer that is not anticipated, rendered obvious, suggested, or even implied by the prior art, either alone or in any combination thereof.

Basically, the present invention discloses a personal computer that looks like a school bus or other toy, which uses identifiable characteristics (e.g., lights, bumpers, wheels, etc.) of the toy for computer control and status functions. The computer mainframe will connect to standard peripherals in the ordinary way, including a monitor, keyboard, mouse, printer, etc. However, the computer itself will have the shape of a school bus or other toy, with various features incorporated into the unit via a combination of molded plastic and printing on the surface and added modeling details.

A CD/DVDS/FLOPPY drive tray may emerge in the luggage area on top of the vehicle or may extend underneath the grille in the bumper area of the vehicle. Optionally, the floppy drive may be above the windshield. The power supply is mounted in the rear of the vehicle with an approximately 8½-inch motherboard running along the bottom portion of the vehicle with peripheral component connectors being accessible for interfacing with the keyboard, monitor, printer, mouse, etc. All these items would typically be off-the-shelf personal computer components. The printed and molded features will include windows, steering wheel, appropriate paint color, wording (such as SCHOOL BUS), headlights, taillights, running lights, tires in wheel wells, grill, bumpers, license plate, etc. The bus-like personal computer will be approximately 20-inches long, 8-inches wide, and 8½-inches high.

To attain this, the present invention essentially comprises a common computer mainframe that is rectangular in shape and is at least two times as long as it is wide and high. This mainframe houses all the standard computer components and has an interface connector for connecting to the bus-like housing. The bus-like housing has a mating interfacing connector, so that when the housing slides over the mainframe the interface connection is completed and the computer control and status functions are transferred to various locations on the bus, such as lights, bumpers, top storage rack, etc.

The child-friendly aspects of the personal computer of the present invention will provide a break from the more boring, beige-box that is commonly associated with computers. There are, of course, additional features of the invention that will be described hereinafter and which will form the subject matter of the claims attached.

There has thus been outlined, rather broadly, the more important features of the invention in order that the detailed description thereof that follows may be better understood and in order that the present contribution to the art may be better appreciated.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention is to provide a new personal computer that provides in the apparatuses and methods of the prior art some of the advantages thereof, while simultaneously overcoming some of the disadvantages normally associated therewith.

It is another object of the present invention to provide a new and improved personal computer that may be easily and efficiently manufactured and marketed.

An even further object of the present invention is to provide a new and improved personal computer that has a low cost of manufacture with regard to both materials and labor, and which accordingly is then susceptible of low prices of sale to the consuming public, thereby making such equipment economically available to the buying public.

Lastly, it is an object of the present invention to provide a new and improved personal computer that will encourage a larger population of children to learn about computers and get acquainted with them prior to going to school.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DESCRIPTION OF THE PREFERRED EMBODIMENT

Figure 1:
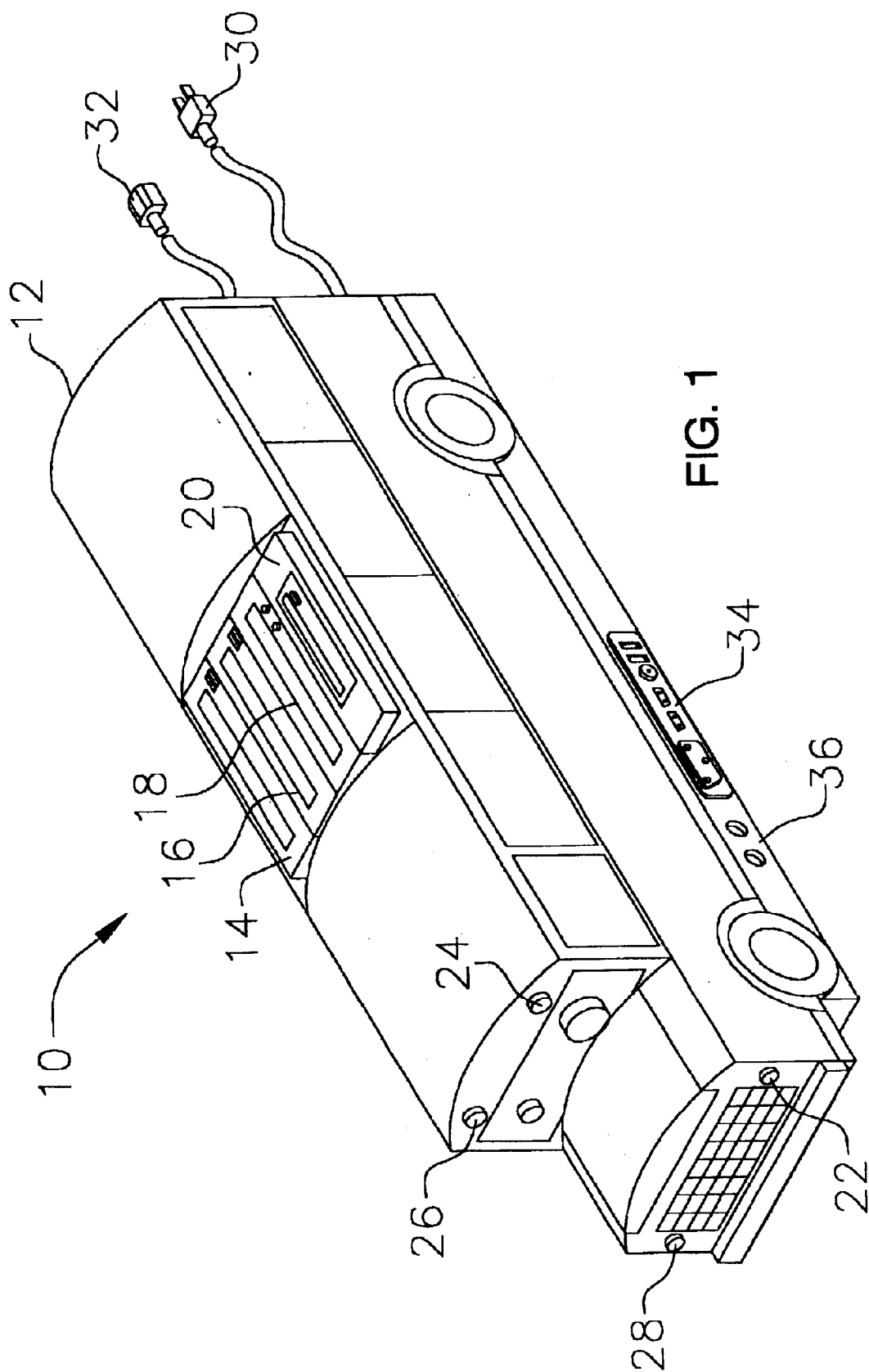
FIG. 1 is a perspective view of the preferred embodiment of the child-friendly personal computer constructed in accordance with the principles of the present invention.

Referring now to the drawings, and particularly to FIGS. 1–4, a preferred embodiment of the personal computer of the present invention is shown and generally designated by the reference numeral 10.

In FIG. 1, a new and improved personal computer 10 of the present invention, primarily for use by children, is illustrated and will be described. More particularly, the child-friendly personal computer 10 has an outer housing 12 that is shaped like a school bus or other toy, with various features incorporated into the unit via a combination of molded plastic and printing on the surface and added modeling details. For example, in this preferred embodiment the various computer drives (CD drive, DVDS drive, rewriteable CD drive, floppy drive) 14–20 emerge from the luggage rack area on top of the school bus. These items could also emerge from the bumpers, above the windshield, or other convenient location where they would appear to be part of the bus (toy). The power switch button 22 is shown representing one of the headlights, the reset button 28 representing the other headlight, and the different status lights 24,26 representing the bus' running lights. These lights might also represent taillights on the bus. The power cord 30 and modem cable 32 are shown extended from the rear of the bus. The peripheral component interface connectors 34 for connecting such items as the monitor, keyboard, printer, mouse, etc., and the speaker/microphone connectors 36 are shown along the bottom of the bus 12.

Figure 2:
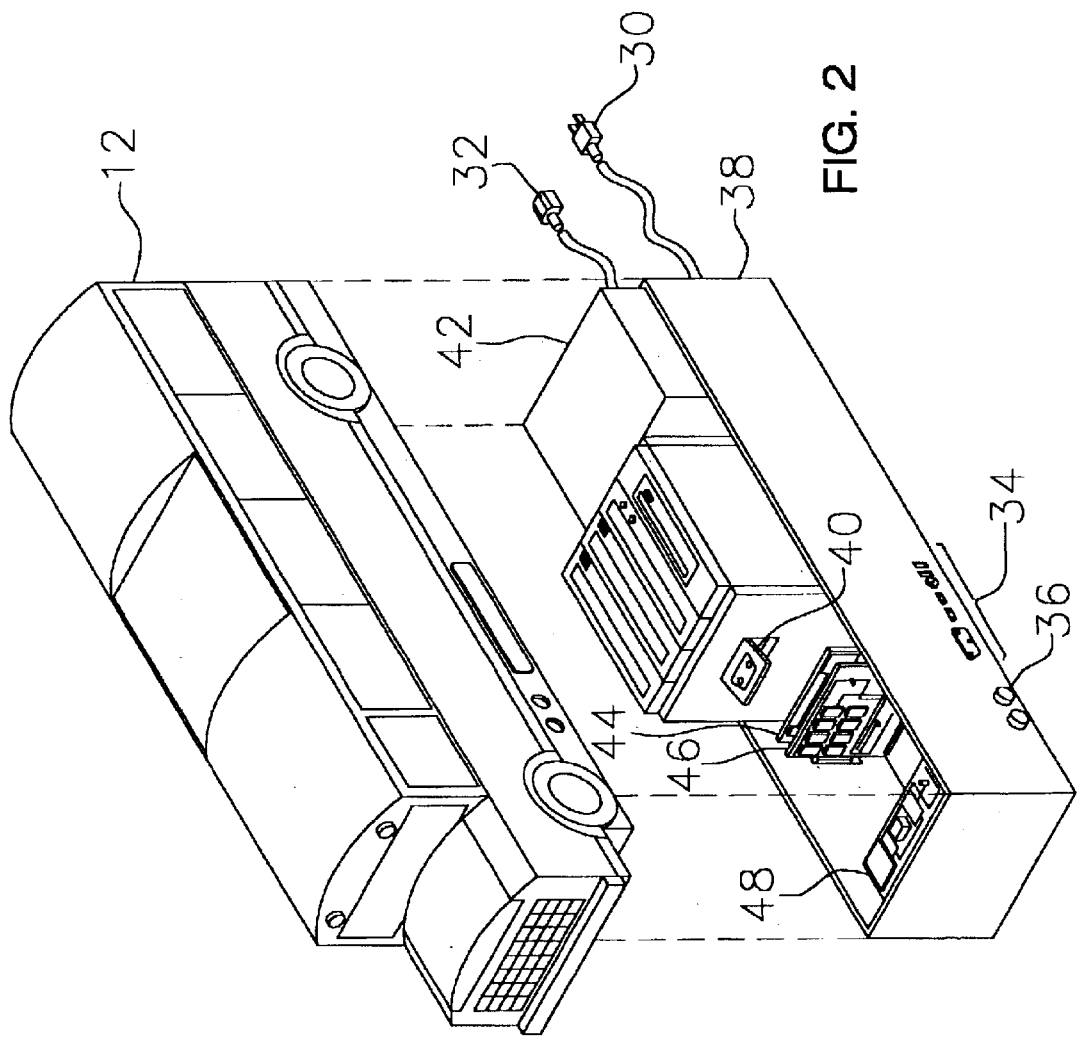
FIG. 2 is a cut-away view of the personal computer of the present invention showing the bus shaped outer housing removed from the computer mainframe.
Figure 3:
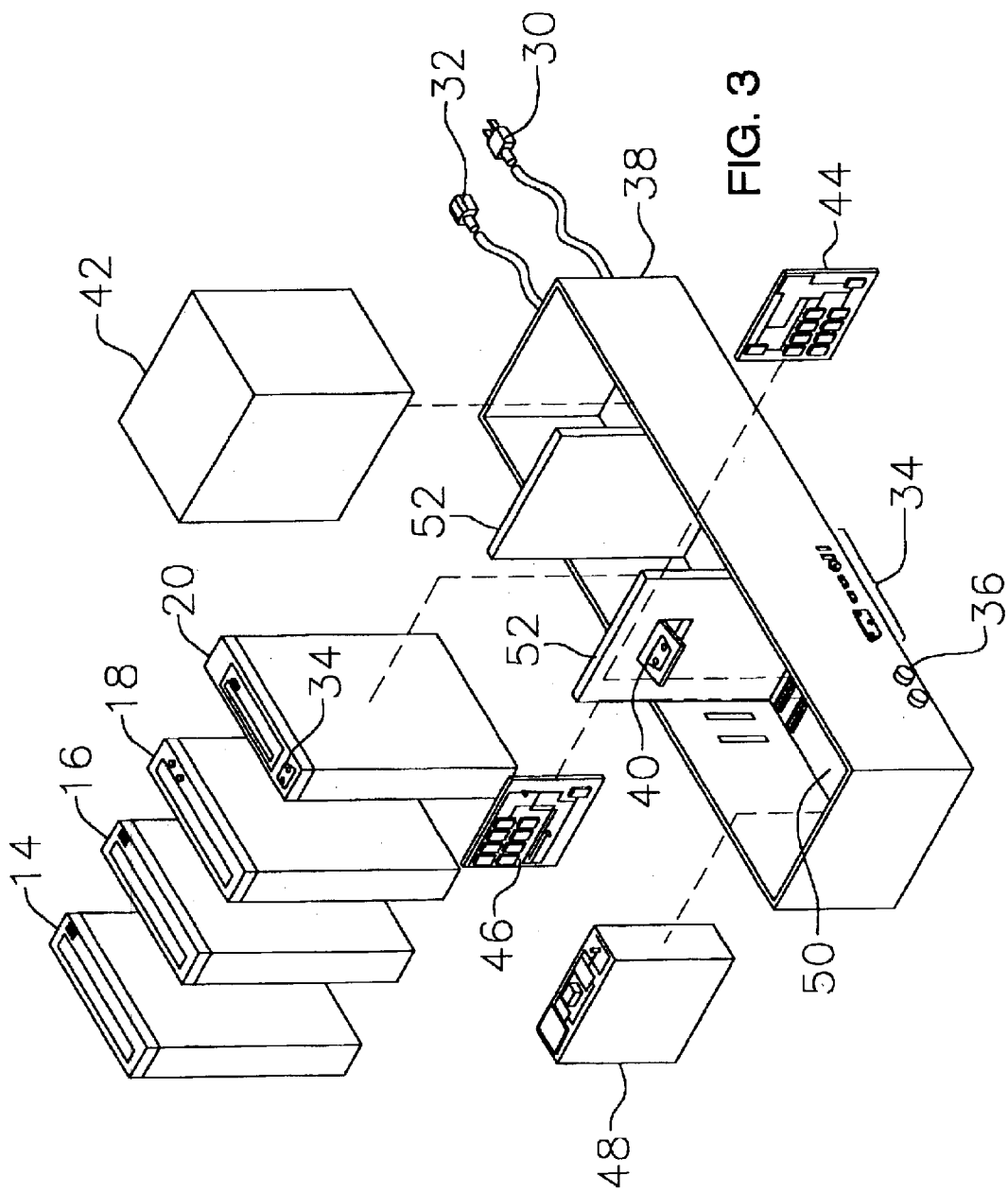
FIG. 3 is a perspective assembly drawing for the common mainframe of the personal computer of the present invention.
Figure 4:
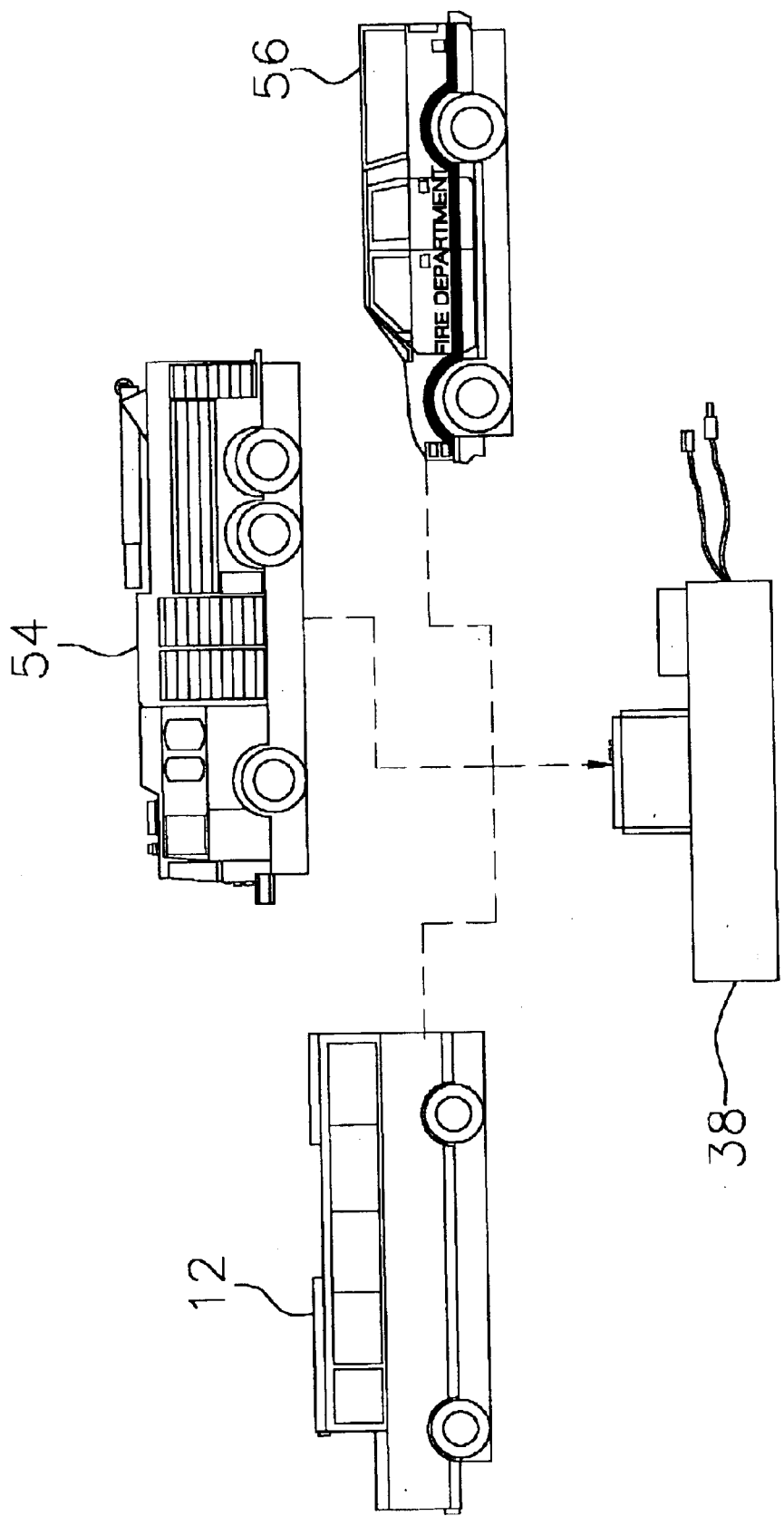
FIG. 4 is a drawing illustrating how various child-friendly computer housings can be installed and interfaced to the common computer mainframe of the personal computer of the present invention.

FIGS. 2 and 3 are cut-away drawings of the child-friendly personal computer of the present invention showing the bus shaped outer housing 12 removed from the computer mainframe 38 and illustrating how the mainframe is arranged. An interface connector 40 is provided on the mainframe 38 and mates with a corresponding interface connector (not shown) inside the bus housing 12 for connecting the various control and status functions to the bus-like housing. As shown, the mainframe 38 is rectangular in shape and is at least two times as long as it is wide and high. Typically, the overall length will be on the order of 20-inches, with the width and height being approximately 8-inches and 8½-inches, respectively. This drawing also shows a typical arrangement of the off-the-shelf computer modules. The various computer drives (CD drive, DVDS drive, RWCD drive, floppy drive) 14–20 plug into a motherboard 50, which runs along the bottom of the mainframe 38, and are mechanically supported by vertical support brackets 52. In this embodiment, the drives emerge from the top of the mainframe so as to be accessible from the top of the bus. The power supply 42 mounts at the rear of the mainframe and supplies the necessary power to the system through a power cord 30 that plugs into a standard power outlet. Other printed wiring boards 44,46 are also plugged into the motherboard 50 to provide functions such as a memory board and an Ethernet board. The hard drive 48 is shown mounted in the front of the mainframe 38, while the speaker/microphone connectors 36 and the peripheral component interface connectors 34 are on the side of the unit. Finally, FIG. 4 is a drawing illustrating how various child-friendly computer housings can be installed and interfaced to the common computer mainframe 38 of the personal computer of the present invention. This includes the bus 12 of the preferred embodiment, a fire truck 54, and a sports utility vehicle (SUV) 56 with Fire Department markings, being installed as the outer housing for various versions of the child-friendly personal computer products. Each housing slides over the mainframe 38, making electrical contact through the computer housing interface connector 40, and is fastened mechanically by fastening means.

In use, the child-friendly personal computer performs as any other computer with the added feature of looking like a toy.

While a preferred embodiment of the child-friendly personal computer has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, the outer housing for the computer can be made to look like any toy-like figure, such as a bus, a fire truck, a car, a sports utility vehicle, a train, an airplane, a football, a cat, a dog, etc. Also, the various computer functions and status lights can be made to represent any desired aspect of the toy.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claim is:

1. A personal computer, comprising:
    a mainframe, said mainframe having a common rectangular shape, said mainframe further comprising:
        a motherboard mounted in said mainframe;
        a floppy disk board plugged into said motherboard;
        a hard drive coupled to said motherboard;
        one or more CD drives coupled to said motherboard;
        a power supply mounted in said mainframe, said power supply coupled to said motherboard;
        a plurality of peripheral component connectors mounted to the exterior of said mainframe, said connectors wired to said motherboard for connecting peripheral components to said computer;
        a power cord wired to said motherboard, said power cord being mechanically attached to said mainframe for strain relief; and
        a computer housing interface connector wired to said motherboard;
    a computer outer housing, said housing having a toy-like shape, said housing comprising:
        a plurality of user-interface computer control functions built into said housing, said functions being located on said housing such as to represent toy features;
        a mainframe interface connector located internal to said housing for connecting said housing to said computer mainframe;
        an access opening to peripheral component connectors on said mainframe; and
        a mechanical connecting means for fastening said housing to said computer mainframe.

2. The personal computer of claim 1, wherein said rectangular shape of said mainframe is at least two times longer than the width and height of said mainframe.

3. The personal computer of claim 1, wherein said computer housing has a shape from the group comprised of: bus, fire truck, car, sports utility vehicle, train, airplane, football, cat, dog, and other animals.

4. The personal computer of claim 1, wherein said peripheral component connectors mounted to said mainframe include connectors from the group comprised of: keyboard connector, monitor connectors, mouse connector, printer connector, modem connector, USB port connectors, speaker connector, microphone connector, and video connector.

5. The personal computer of claim 1, wherein easy access to computer controls and drives is functionally provided through various features on said toy-like housing.

6. The personal computer of claim 1, wherein said housing is fabricated of materials from the group comprised of: molded plastic, sheet metal, hard rubber, and fiberglass.

7. The personal computer of claim 5, wherein said plurality of user-interface computer control functions transferred to said housing are from the group comprised of: power switch, computer status light, hard drive status light, and reset button.

8. The personal computer of claim 7, wherein said user-interface computer control functions represent features of various toy functions from the group comprised of: headlights, running lights, tail lights, bumpers, hubcaps, eyes, nose, and ears.

9. A personal computer outer housing, comprising:
    a toy-shaped housing;
    a standard interface connector mounted in said housing for connecting to a common personal computer mainframe;
    a plurality of computer control functions for said computer being built into said housing, said controls functions being located on said housing such as to represent toy features;
    an access opening to peripheral component connectors on said mainframe; and
    a mechanical connecting means for fastening said housing to said computer mainframe.

10. The housing of claim 9, wherein said computer housing has a shape from the group comprised of: bus, fire truck, car, sports utility vehicle, train, airplane, football, cat, dog, and other animals.

11. The housing of claim 9, wherein said access opening to said peripheral component connectors mounted to said mainframe provides access to connectors from the group comprised of: keyboard connector, monitor connectors, mouse connector, printer connector, modem connector, USB port connectors, speaker connector, microphone connector, and video connector.

12. The housing of claim 9, wherein said plurality of computer control functions transferred to said housing are from the group comprised of: power switch, computer status light, hard drive status light, and reset button.

13. The housing of claim 9, wherein said housing is fabricated of materials from the group comprised of: molded plastic, sheet metal, hard rubber, and fiberglass.

14. The housing of claim 12, wherein said computer control functions represent features of various toy functions from the group comprised of: headlights, running lights, tail lights, bumpers, hubcaps, eyes, nose, and ears.

15. A personal computer system, comprising:
    a mainframe, said mainframe having a common rectangular shape, said mainframe further comprising:
        a motherboard mounted in said mainframe;
        a floppy disk drive plugged into said motherboard;
        a hard drive coupled to said motherboard;
        one or more CD drives coupled to said motherboard;
        a power supply mounted in said mainframe, said power supply coupled to said motherboard;
        a plurality of peripheral component connectors mounted to the exterior of said mainframe, said connectors wired to said motherboard for connecting peripheral components to said computer;

a power cord wired to said motherboard, said power cord being mechanically attached to said mainframe for strain relief; and an interface connector wired to said motherboard for interfacing with a computer housing;

a computer outer housing, said housing having a toy-like shape, said housing comprising:

a plurality of computer control functions being built into said housing, said controls functions being located on said housing such as to represent toy features;

a mainframe interface connector located internal to said housing for connecting said housing to said computer mainframe;

an access opening to peripheral component connectors on said mainframe;

a mechanical connecting means for fastening said housing to said computer mainframe;

a keyboard coupled to said computer mainframe;

a monitor coupled to said computer mainframe;

a mouse coupled to said computer mainframe;

one or more speakers coupled to said computer mainframe;

a microphone coupled to said computer mainframe a zip drive coupled to said computer mainframe;

a video camera coupled to said computer mainframe; and a modem coupled to said computer mainframe.

16. The system of claim 15, wherein said computer housing has a shape from the group comprised of: bus, fire truck, car, sports utility vehicle, train, airplane, football, cat, dog, and other animals.

17. The system of claim 15, wherein said peripheral component connectors mounted to said mainframe include connectors from the group comprised of: keyboard connector, monitor connectors, mouse connector, printer connector, modem connector, USB port connectors, speaker connector, microphone connector, and video connector.

18. The system of claim 15, wherein said plurality of computer control functions transferred to said housing are from the group comprised of: power switch, computer status light, hard drive status light, and reset button.

19. The system of claim 15 system, wherein said housing is fabricated of materials from the group comprised of: molded plastic, sheet metal, hard rubber, and fiberglass.

20. The system of claim 18, wherein said computer control functions represent features of various toy functions from the group comprised of: headlights, running lights, tail lights, bumpers, hubcaps, eyes, nose, and ears.

* * * * *